US010252286B1

(12) United States Patent
Moore (10) Patent No.: US 10,252,286 B1
(45) Date of Patent: Apr. 9, 2019

(54) FLEXIBLE TUBULAR TAPE (71) Applicant: Tube Tape, LLC, North Chesterfield, VA (US)

(72) Inventor: Leo M. Moore, Deltaville, VA (US)

(73) Assignee: Tube Tape, LLC, Richmond, VA (US)

( * ) Notice: Subject to any disclaimer, the term of this patent is extended or adjusted under 35 U.S.C. 154(b) by 0 days.

(21) Appl. No.: 16/200,725

(22) Filed: Nov. 27, 2018

Related U.S. Application Data (63) Continuation of application No. 15/002,451, filed on Jan. 21, 2016, now Pat. No. 10,166,566.

(51) Int. Cl.
| | |
|---|---|
| *B32B 3/26* | (2006.01) |
| *B05B 12/26* | (2018.01) |
| *B65D 85/20* | (2006.01) |
| *C09J 7/20* | (2018.01) |
| *B05B 12/24* | (2018.01) |
| *B32B 1/08* | (2006.01) |

(52) U.S. Cl.
CPC ............ *B05B 12/265* (2018.02); *B05B 12/24* (2018.02); *B32B 1/08* (2013.01); *B65D 85/20* (2013.01); *C09J 7/20* (2018.01); *B32B 2307/546* (2013.01); *B32B 2405/00* (2013.01); *C09J 2201/606* (2013.01)

(58) Field of Classification Search
CPC ...... B65D 85/20; B65D 85/67; B65D 85/672; B05B 12/265; B05B 12/24; B05B 12/0456; B32B 2307/546; B32B 2405/00; B32B 1/08; A47L 25/005

USPC .............. 206/411, 443, 460; 428/40.1, 41.8, 428/317.3, 343
See application file for complete search history.

(56) References Cited

U.S. PATENT DOCUMENTS

| | | | | |
|---|---|---|---|---|
| 1,785,512 | A * | 12/1930 | Buttenheim | ............ A47L 23/10 15/104.002 |
| 1,960,137 | A * | 5/1934 | Brown | .................. E04B 1/6812 2/338 |
| 4,115,609 | A * | 9/1978 | Denman | .................... E06B 3/56 428/68 |
| 5,128,176 | A * | 7/1992 | Schmidt | .................. B05B 12/26 427/140 |
| 5,260,097 | A * | 11/1993 | Silvestre | ................. B05B 12/24 427/282 |
| 5,407,716 | A * | 4/1995 | Mitchell | ............... B29C 59/007 156/267 |
| 6,793,998 | B1 * | 9/2004 | Silvestre | ................. B05B 12/26 428/40.1 |
| 7,584,854 | B2 * | 9/2009 | Chandaria | ............ B65D 5/5038 206/391 |
| 2003/0165650 | A1 * | 9/2003 | Hirota | .................... A47L 25/005 428/40.1 |
| 2016/0138165 | A1 * | 5/2016 | Porodo | ............... C23C 18/1605 427/282 |

* cited by examiner

*Primary Examiner* — Luan K Bui
(74) *Attorney, Agent, or Firm* — John H. Thomas, P.C.

(57) ABSTRACT

A flexible tubular tape product includes a hollow tape tube formed from a spiral wound strip of overlapping pressure sensitive adhesive coated tape. The hollow tube defines an empty interior core space. The outside surface of the hollow tape tube is coated with the pressure sensitive adhesive. A flexible core shaft is positioned inside the interior core space of the hollow tape tube in order to impart some body and ease of handling to the tape tube product.

7 Claims, 7 Drawing Sheets

FLEXIBLE TUBULAR TAPE

This application is a continuation of U.S. application Ser. No. 15/002,451, filed Jan. 21, 2016, which claims the benefit of U.S. Provisional Application Ser. No. 62/115,985 filed Feb. 13, 2015, both of which are incorporated by reference herein in their entirety.

The field of the invention is a flexible tape product, including tape that is commonly referred to as masking tape/jamb tape/aperture tape, that maybe used in connection with painting applications, dust abatement and fixing papers to various surfaces.

BACKGROUND

Masking tape is a very popular and widely-used product by professional painters and handymen generally and by consumers broadly. Masking tape may be used for painting applications, dust abatement, fixing posters and artwork to walls and windows in an office or classroom setting, or other general purposes for which tape may be applied. Specifically with respect to the painting application, a flat masking tape used on the fringe of a painting surface may create unwanted hard paint edges.

While these hard paint edges may be acceptable and even desirable in some painting applications, in the automotive refinishing business, for instance, these types of edges are undesirable. Also, the automotive refinishing business is challenging when refinishing around or near automobile door jambs, front hoods and trunk lids where the aperture must be sealed off to prevent paint or primer from entering the passenger or engine compartment during the spray painting process.

The prior art also includes a plain, hollow tube of tape. A strip of tape is wound around overlapping itself to form a hollow tube. This tube is then used with some painting edge applications. However, it was found that the hollow tape tube alone was flimsy and prone to folding over and collapsing on itself. It does not maintain its round tubular shape very well, especially around curves and sharp corners.

SUMMARY

Accordingly, it is an object of the present invention to provide a flexible tubular tape that solves some of the foregoing challenges with automotive refinishing and painting. Moreover, the tubular product may have more general application to painters and handymen.

In one example, a flexible tubular tape product comprises a hollow tape tube formed from a spiral wound strip of overlapping pressure sensitive adhesive coated tape. The hollow tube defines an empty interior core space. The outside surface of the hollow tape tube is coated with the pressure sensitive adhesive. A flexible core shaft is positioned inside the interior core space of the hollow tape tube. The hollow tape tube may be substantially circular in cross section. The flexible core shaft may have a cross sectional shape selected from the group consisting of circular, oval, square and rectangular. The flexible core shaft defines an outside diameter, and the hollow tape tube defines an inside diameter, and in one example, the outside diameter of the core shaft is less than the inside diameter of the hollow tape tube. The length of the outside diameter of flexible core shaft may be about 50% to 98% of the length of the inside diameter of the hollow tape tube. The flexible core shaft may be comprised of a polymer foam which may be selected from the group consisting of closed cell polyurethane, open cell polyurethane, closed cell polyethylene, and polypropylene. The flexible core shaft may also be a paper product, cellulose, a chenille stem or a hollow plastic tube or a solid plastic rod, or a malleable material. The strip of overlapping pressure sensitive adhesive coated tape may have a width of from about ½ to six inches, or alternatively ⅝ to 3 inches, or still further alternatively about ¾ to 1½ inches. The width of overlap of the strip of overlapping pressure sensitive adhesive coated tape is about 1/32 to 2 inches, or alternatively about 1/16 to 1 inch, or alternatively about 1/16 to 5/32 inches, or still further alternatively about ⅛ inch.

In a further example, there is disclosed a flexible tubular tape product and a shipping container. The flexible tubular tape product is described above. The flexible tubular tape is cut into predetermined length segments. A shipping container has a plurality of tubular chambers therein, wherein each chamber has an inside diameter that is greater than an outside diameter of the tape tube. The inside surface of each of the shipping container tubular chambers is coated with a release coating, and the shipping container tubular chambers have a tubular length of at least about the length of the predetermined length segments of flexible tubular tape.

DETAILED DESCRIPTION

The invention is directed to a flexible tubular tape product. The tape tube is formed from a spiral wound strip of pressure sensitive adhesive tape. The tape strip is a flat strip that can be a strip of several sizes, including from about a ½ inch strip to six inch strip, alternatively about ⅝ to three inches or still further alternatively about ¾ to 1½ inches. This tape strip is then wound so that there is an overlap of the strip to form a hollow tape tube. This is a substantially constant overlap so that there is a solid tube wall. The amount of actual overlap is variable depending on a desired thickness of the tape tube wall which may also benefit the rigidity and durability of the wound tape tube. The amount of overlap may range depending on the size of the tape strips being wound. The overlap may range from about 1/32 to two inches, alternatively about 1/16 to one inch or alternatively about 1/16 to 5/32 inches, or still further alternatively about ⅛ inch. The actual diameter of the spiral wound tape tube may depend on the intended application. This diameter may be very small and tight, from about ¼ inch in cross-sectional diameter to about one inch in cross-sectional diameter, or alternatively about ⅟₁₆ to two inches in cross-sectional diameter, or still further alternatively about ⅜ to ½ inches in cross-sectional diameter. If the tape tube becomes too large, then it becomes similarly flimsy if the tape strip is thin.

The tape strip is adhesive-coated on at least one side. The strip is then wound so that the outside of the tape tube exposes the adhesive-coated side. Alternatively, the tube tape may be formed from strips of two-sided adhesive tape. The adhesive tape strip material can be any plastic or paper substrate. In some applications, it is believed that a masking tape material is desirable. Also, the amount of tackiness of the adhesive may vary with use. It is believed that the use of a temporary or relatively releasable adhesive would be desired in, for instance, the examples of edging a paint job. Alternatively, in the example of use of a flexible tape tube for mounting of pictures or artwork, the adhesive may be chosen to be of a more tacky or permanent adhesive. In one example, the adhesive strength is about 10 to 800 Newtons/meter, or alternatively about 100 to 600 N/m, or still further alternatively about 300 to 500 N/m.

The adhesive tube may be wound in predetermined length segments. For instance, a 36 inch or 48 inch tube segment may be handy or usable for some painting applications. The length of the predetermined segments would be driven by the intended commercial purpose. Also, the use of predetermined length segments may enable the ease of shipping of these particular tubular tape segments. A uniform length is easy to package in a uniform length tube or shipping container. Alternatively, the hollow tape tube may also be wound in a spool with a release layer separator between windings. This spool may be desirable and more practical when the tape tube is relatively more flat in cross section than a circular tape tube.

A flexible core shaft is intended to be positioned inside the hollow tape tube. The flexible core shaft may fill approximately 25-100% of the inside of the tape tube, or alternatively about 50-90%, or still further alternatively about 60-80%. The flexible core shaft will have approximately the same length of the predetermined segments of tape tube when fabricated in those predetermined segments. The flexible core shaft is deployed or positioned along substantially the entire length of the hollow tape tube.

The cross-sectional shape of the flexible core shaft is variable. In the example of a circular cross-section tape tube, the flexible core shaft may likewise have a circular cross-section. Alternatively, that flexible core shaft may have an oval, square, rectangular, star or other cross-sectional shape. The size of the flexible core shaft may be close to the inside diameter of the tape tube so that the shape of the flexible core shaft will make the cross-sectional shape of the tape tube roughly corresponding to the core shaft shape.

The core shaft material may be made of a preformed, solid foam tube formed from for instance, an open cell or closed cell polyurethane foam, and open or closed cell polyethylene foam or polyester or other polymer material. Alternatively, the hollow tape tube may be filled with an expanding liquid foam filler that would then expand to fill approximately 100% of the inside hollow portion of the tape tube. Another flexible core material would be a chenille stem, a hollow plastic tube, or a solid plastic tube.

The strip of pressure sensitive adhesive tape that is wound to form the tape tube may be formed of multiple colors. Written indicia may be printed on the outside surface of the tape to impart some attributes of the tape tube including, for instance, its size or stickiness/tackiness. Alternatively, the tape strip may be colored or printed with indicia to impart marketing or brand information regarding the tape tube.

The tape tube, when cut in predetermined lengths segments, may be easily shipped in a box or tube that has individual tubular chambers mounted therein. Each of these tubular chambers in the shipping container would be large enough to allow the predetermined tubular tape segment to slide into and be removed from the shipping container. The interior walls of those shipping chambers would be formed with a release coating layer so that the tubular tape does not permanently fix to the inside of the shipping container.

Figure 1:
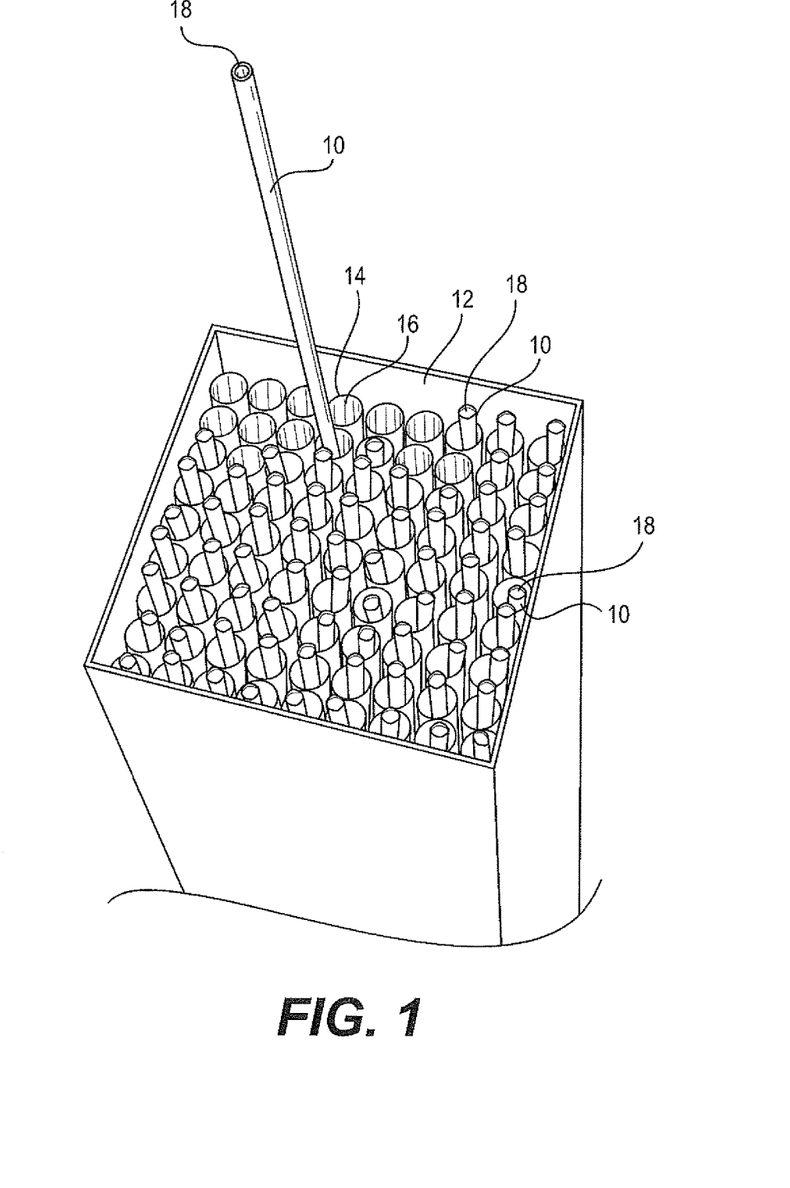
FIG. 1 is a perspective view of the top of a shipping container for carrying tubular tape segments as described herein.

Turning now to the figures, FIG. 1 illustrates a shipping container 12 that may be used to ship and/or store multiple tubular tape segments 10. The container 12 includes a layout of tubular chambers 14. These tubular chambers 14 run substantially from the top of the container 12 to the bottom (not shown). The tape tube segments 10 are precut in lengths that substantially correspond to the lengths of the shipping container chambers 14. In FIG. 1, most of the chambers 14 are shown having tube tape segments 10 position therein. One of the tape tubes 10 is shown in a partially removed positioned as a user would select a tape tube segment and remove it from the container 12. The tape tubes 10 are shown having an inside flexible core shaft 18 mounted therein inside the hollow tubular cross section of the tape tube. The tubular chambers 14 inside the container have a release coating side 16 on the inside of those tubular chambers. In this way, the tape tube segments 10 will not adhere to the side of those chambers 14. Also, the length of those chambers 14 as shown is substantially the same but may be slightly less than the length of the tape tubes so that a user may easily grasp the end of a tape tube to remove it from the container 12. The chambers 14 cannot be significantly less in length in the tape tubes or else the tape tubes may stick together in an undesirable way during shipment or use. Alternatively, the chambers 14 may not be too much longer than the tape tubes 10, because then it could be difficult for user to reach into and extract a tape tube from the chamber 14. Tape tube segments may be about ±two inches of the length of a shipping container chamber, or alternatively about ±one inch, or ±½ inch, or substantially the same length. The shipping container 12 may take any shape including round or rectangular or a different form. Also, the arrangement of chambers 14 inside the container 12 may be orderly in rows and columns as shown in FIG. 1 or, alternatively, may be more randomly disposed inside the shipping container.

Figure 2:
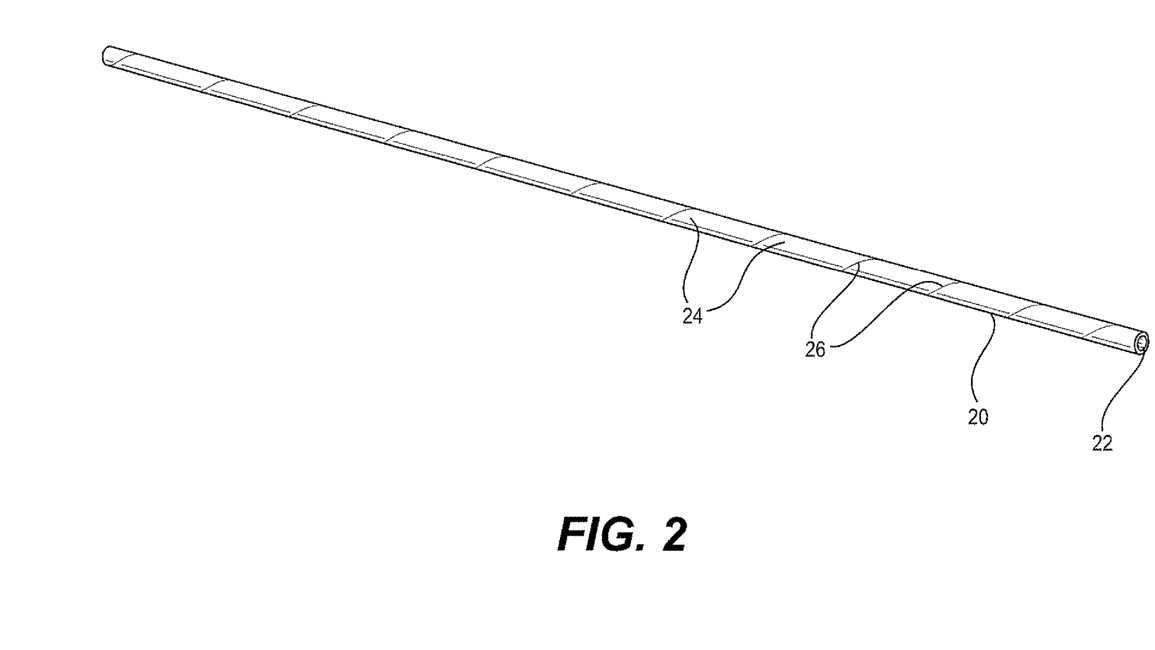
FIG. 2 is a perspective view of an example of a tubular tape segment.

Turning to FIG. 2, there is shown a perspective view of a tubular tape segment 20. The tubular tape segment 20 includes a core shaft 22 that extends along substantially the entire length of the tape tube. A core shaft may alternatively be within about ±two inches, or about ±one inch, or about ±½ inch of the length of a tape tube. The tape tube 20 is formed of a strip of pressure sensitive adhesive tape 24 that overlaps itself as shown by the spiral lines 26. The actual length of the tape tube 20 may be predetermined for use in different applications.

Figure 3:
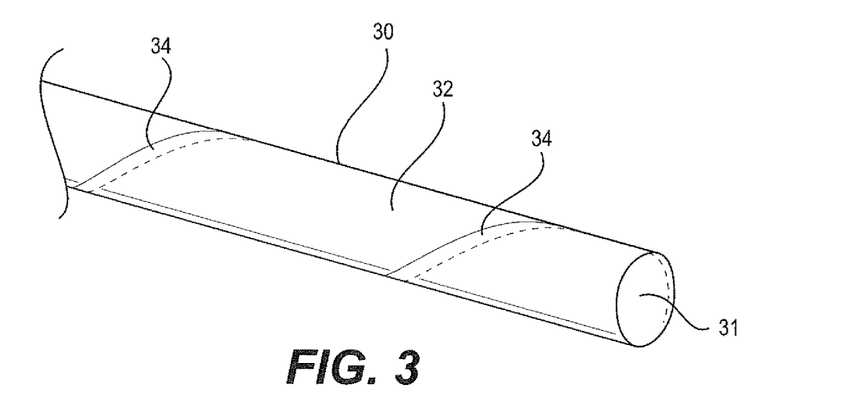
FIG. 3 is a perspective view of the end of a hollow tape tube.

FIG. 3 is a close-up of the end of a tape tube 30. The tape tube is shown having a hollow center 31. A strip of pressure sensitive adhesive tape 32 is shown as being spiral wound with an overlap 34.

Figure 4:
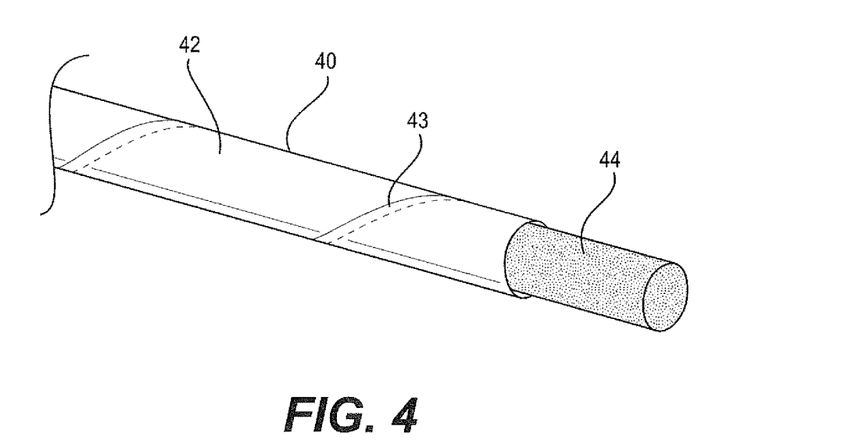
FIG. 4 is a perspective view of the end of a hollow tape tube with a flexible core shaft positioned inside thereof.

FIG. 4 illustrates a spiral wound tape tube 40 formed from a strip of pressure sensitive adhesive tape 42 that overlaps itself with the overlaps 43 shown. In this example, the tape tube 40 includes a flexible core shaft 44 positioned therein. This core 44 may be formed of a foam product as described herein or as a solid rod of plastic.

Figure 5A:
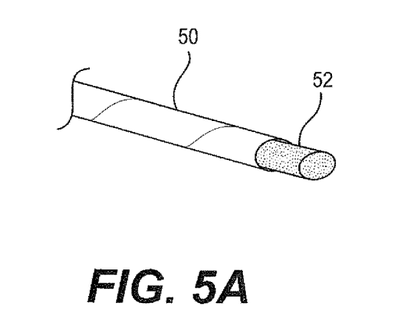
FIGS. 5A-5F are perspective views of an end of alternative examples of a tubular tape product having various shapes of the core shaft mounted therein.
Figure 5B:
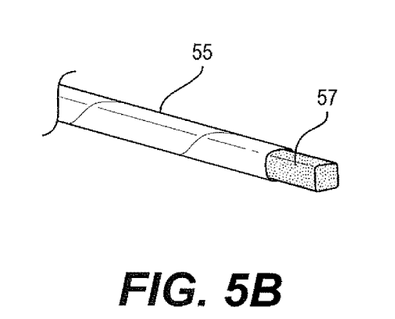
Figure 5C:
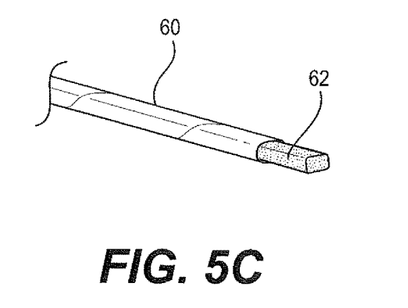
Figure 5D:
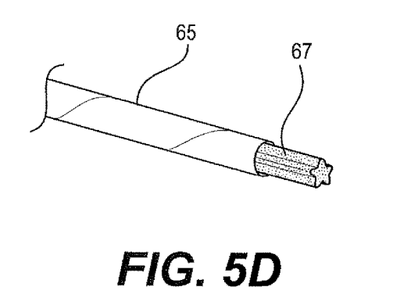
Figure 5E:
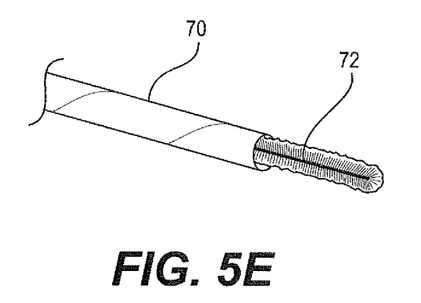
Figure 5F:
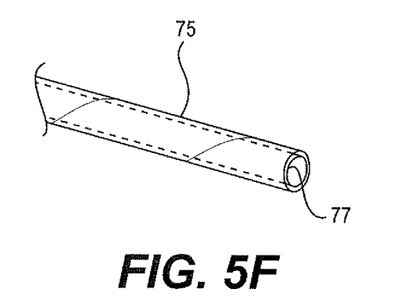

FIGS. 5A-5F illustrate alternative tubular tape product shapes and core materials. In FIG. 5A, the tape tube 50 has an oval-shaped foam core shaft 52 mounted therein. The core 52 is sized to bear against the inside walls of the tape tube 50 to impart the oval shape of the tape tube 50. FIG. 5B illustrates a tape tube 55 having a square core shaft 57 positioned therein. The square core shaft 57 bears against the inside walls of the tape tube 55 to impart a square shape to the tape tube. FIG. 5C illustrates a tape tube 65 having a rectangular core shaft 62 positioned therein. This rectangular shape 62 may have other dimensions and relative size. In any event, the rectangular core shaft 62 imparts a rectangular shape to the tape tube 60. FIG. 5D illustrates a substantially round tape tube 65 having a star-shaped cross sectional core shaft 67 positioned inside thereof. FIG. 5E illustrates a substantially round tape tube 70 having a chenille stem core shaft 72 disposed therein. FIG. 5F illustrates a substantially circular cross section tape tube 75 having a second hollow core tube 77 positioned in the center thereof. The core tube 77 may be made of paper or plastic or other composite materials. The core tube 77 may also include the shapes as shown, for instance, in FIGS. 5A-5E however with the core tube being a second hollow core tube inside the hollow tape tube 75.

Figure 6:
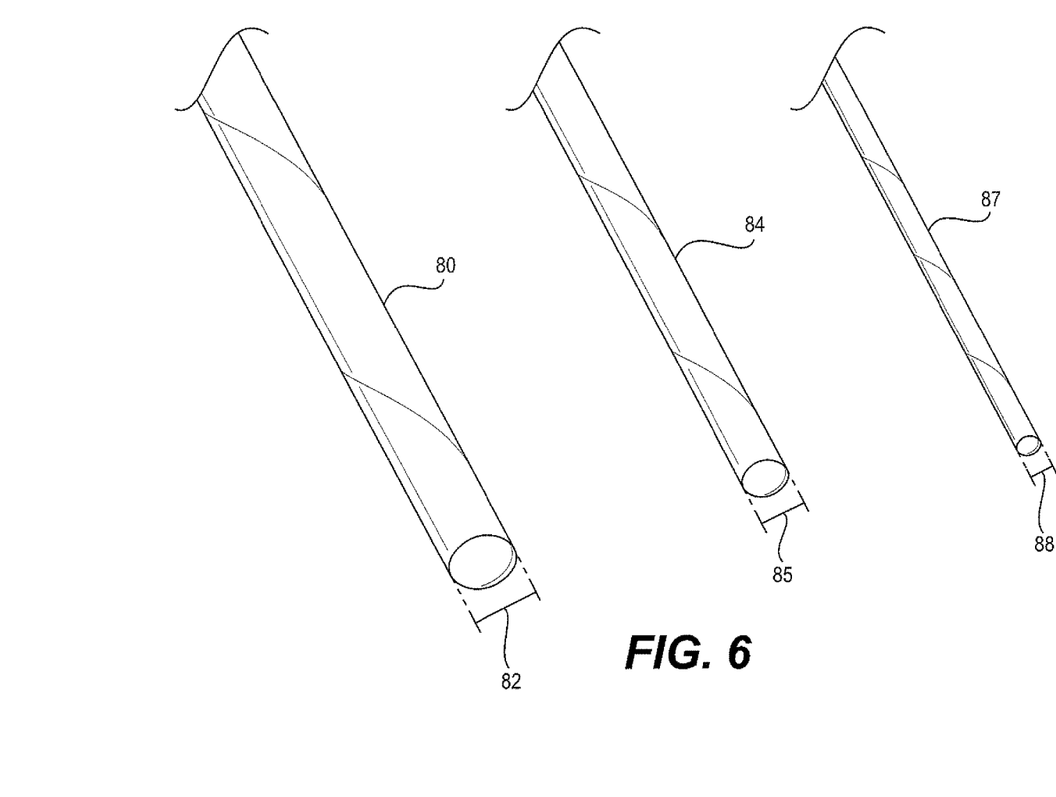
FIG. 6 illustrates three examples of a hollow tape tube having different diameters of circular cross section.

FIG. 6 illustrates tape tubes 80, 84 and 87 having different cross sectional diameters 82, 85 and 88 respectively. These different diameter tape tubes with cores mounted therein (not shown) may be used for different applications by an end user. As noted earlier, the diameter of this tape tube may range from about ¼ inch to about 1 inch, or alternatively, it could range from about 1/16 inch to about 2 inches.

Figure 7:
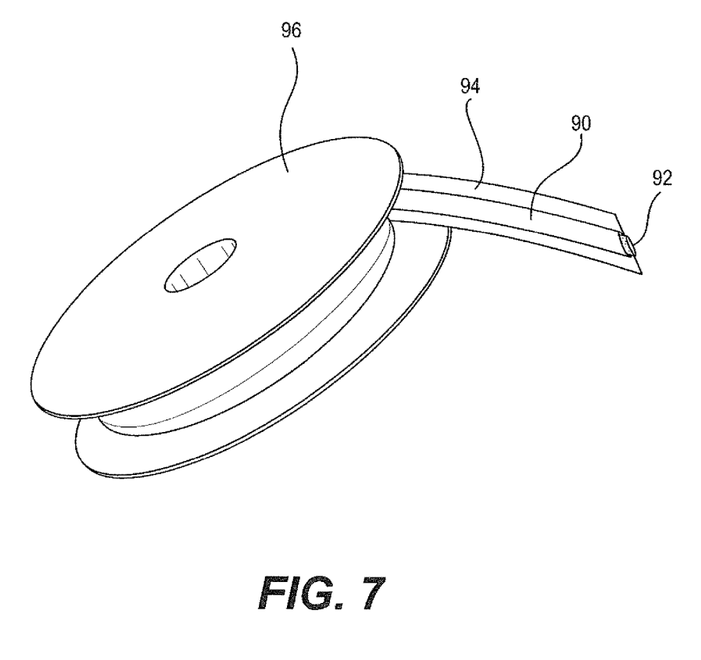
FIG. 7 is a perspective view of a roll of tubular tape product.

FIG. 7 illustrates a tube 90 having a core shaft 92 positioned therein. In this example, the tape tube 90 is positioned on a strip of release paper 94 that is in turn wound upon itself in a dispensing roll 96. The shape of the tape tube 90 may be any appropriate shape, but is believed that a relatively more narrow oval or square shape is more efficient for winding and storage.

Figure 8A:
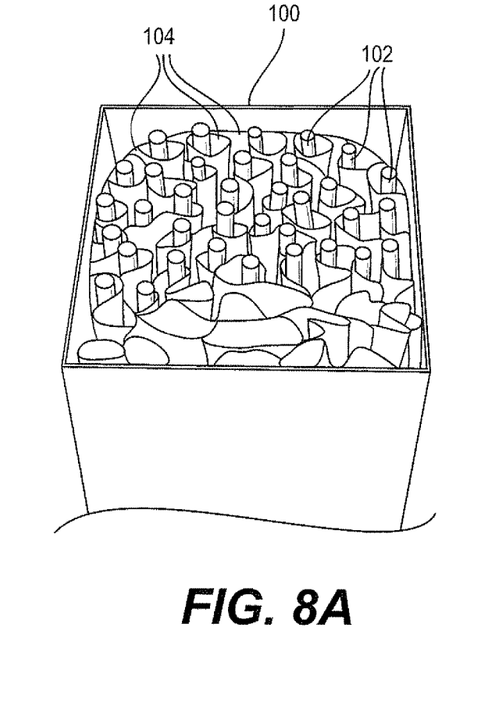
FIGS. 8A and 8B are perspective views of a shipping container and a chamber lining material for carrying tubular tape products.
Figure 8B:
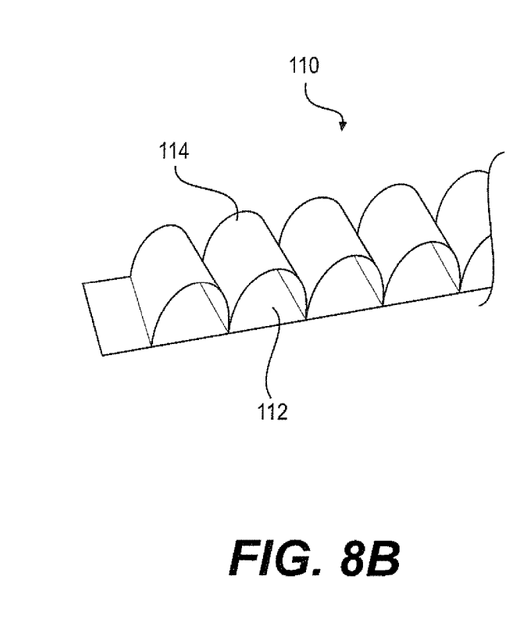

FIGS. 8A and 8B illustrate another combination of shipping container and flexible tape tube. In FIG. 8A, a shipping container 100 has a generally square shape. The shipping container has an arrangement of lengthwise tubular chambers 104 positioned therein. Those tubular chambers 104 have flexible tape tubes 102 mounted therein. As with the example shown in FIG. 1, the chambers 104 are formed of release coated paper so that the tape tubes 102 will not stick and get stuck inside those chambers in container 100. FIG. 8B is a close up of one example of this formation of chambers as shown, for instance, in chamber 104. In FIG. 8B, a strip of release coated paper 112 has a second strip of release coated paper 114 fixed to it so that the second layer of release coated paper 114 forms a honeycomb or loops with the first layer 112. This collection of chambers 110 is a flexible structure that may be easily used and disposed of or, alternatively, reused as desired. These layers of release paper 112 and 114 are typically formed of paper or plastic and coated with a non-stick release layer.

Other embodiments of the present invention will be apparent to those skilled in the art from consideration of the specification. It is intended that the specification and figures be considered as exemplary only, with a true scope and spirit of the invention being indicated by the following claims.

What is claimed is:

1. A flexible, tubular tape product comprising;
   a hollow tape tube formed from a spiral wound, overlapping tape strip;
   wherein the tape strip includes a substrate layer and a pressure adhesive layer on at least one side of the substrate layer;
   further wherein the hollow tape tube defines an empty interior core space and further wherein the outside surface of the hollow tape tube is coated with the pressure sensitive adhesive;
   and a flexible core shaft inside the interior core space of the hollow tape tube, wherein the flexible core shaft is formed of a liquid foam filler.

2. A flexible, tubular tape product as described in claim 1, wherein the hollow tape tube is substantially circular in cross-section.

3. A flexible, tubular tape product as described in claim 1, wherein the strip of overlapping pressure sensitive adhesive coated tape has a width of from about ½ to six inches.

4. A flexible, tubular tape product as described in claim 1, wherein the tape strip has a width of from about ¾ to 1½ inches.

5. A flexible, tubular tape product as described in claim 1, wherein the width of overlap of the tape strip is about 1/16 to two inches.

6. A flexible, tubular tape product comprising;
   a hollow tape tube formed from a spiral wound, overlapping tape strip;
   wherein the tape strip includes a paper substrate layer and a pressure adhesive layer on at least one side of the paper substrate layer;
   further wherein the hollow tape tube defines an empty interior core space and further wherein the outside surface of the hollow tape tube is coated with the pressure sensitive adhesive;
   and a flexible core shaft inside the interior core space of the hollow tape tube.

7. A flexible, tubular tape product as described in claim 6, wherein the flexible core shaft is formed of a liquid foam filler.

* * * * *